April 26, 1966   G. A. KIRK   3,248,691
OBJECT DETECTION SYSTEM
Original Filed April 2, 1962   4 Sheets-Sheet 1
FIG. I
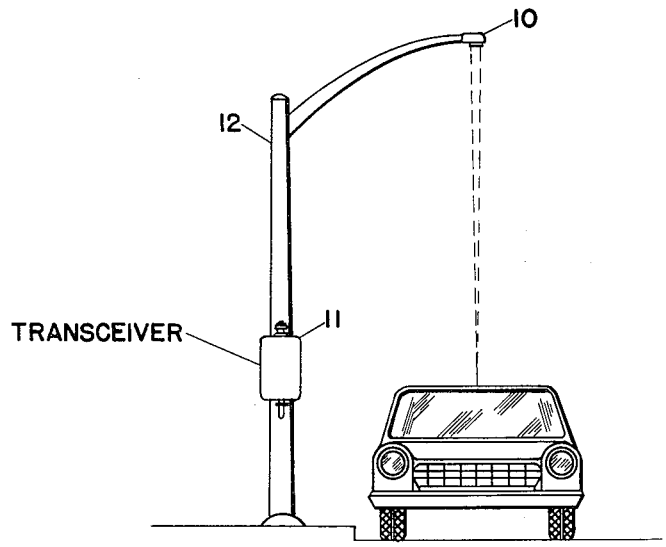
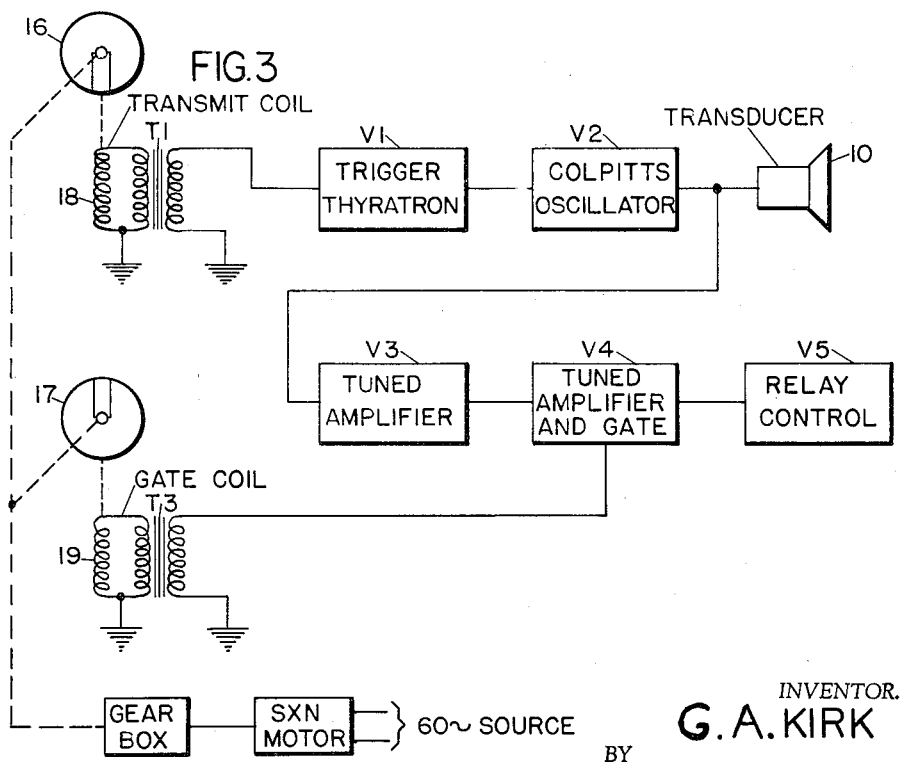
INVENTOR.
G. A. KIRK
BY
HIS ATTORNEY April 26, 1966   G. A. KIRK   3,248,691
OBJECT DETECTION SYSTEM
Original Filed April 2, 1962   4 Sheets-Sheet 2

INVENTOR.
G. A. KIRK
BY
HIS ATTORNEY

April 26, 1966 G. A. KIRK 3,248,691
OBJECT DETECTION SYSTEM
Original Filed April 2, 1962 4 Sheets-Sheet 3
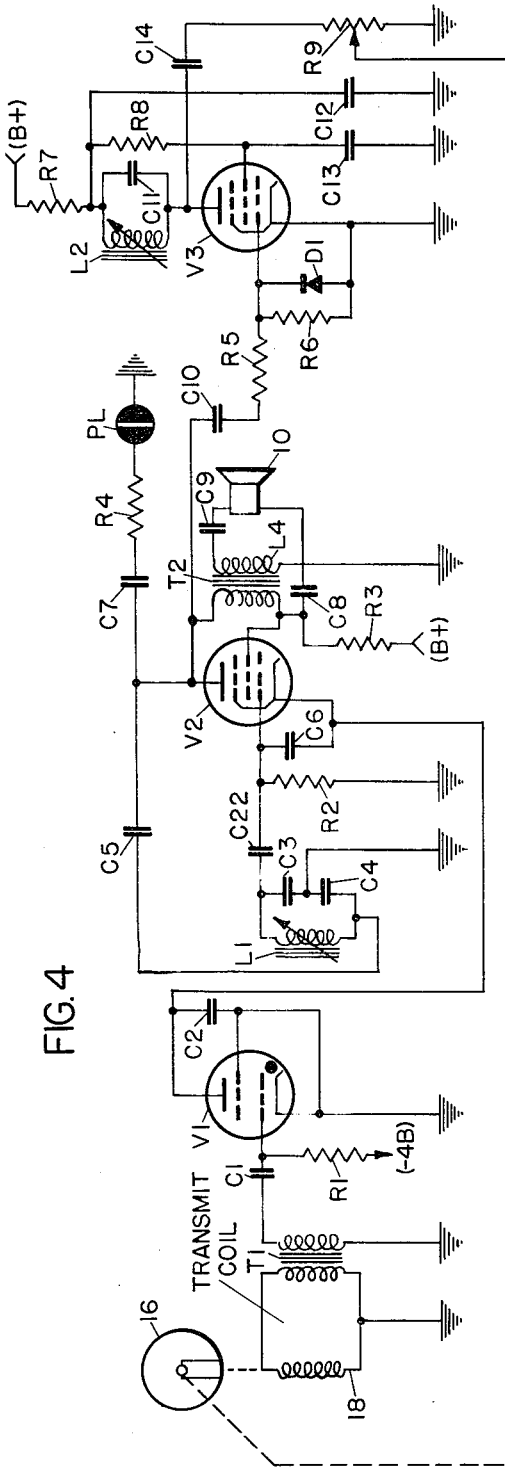
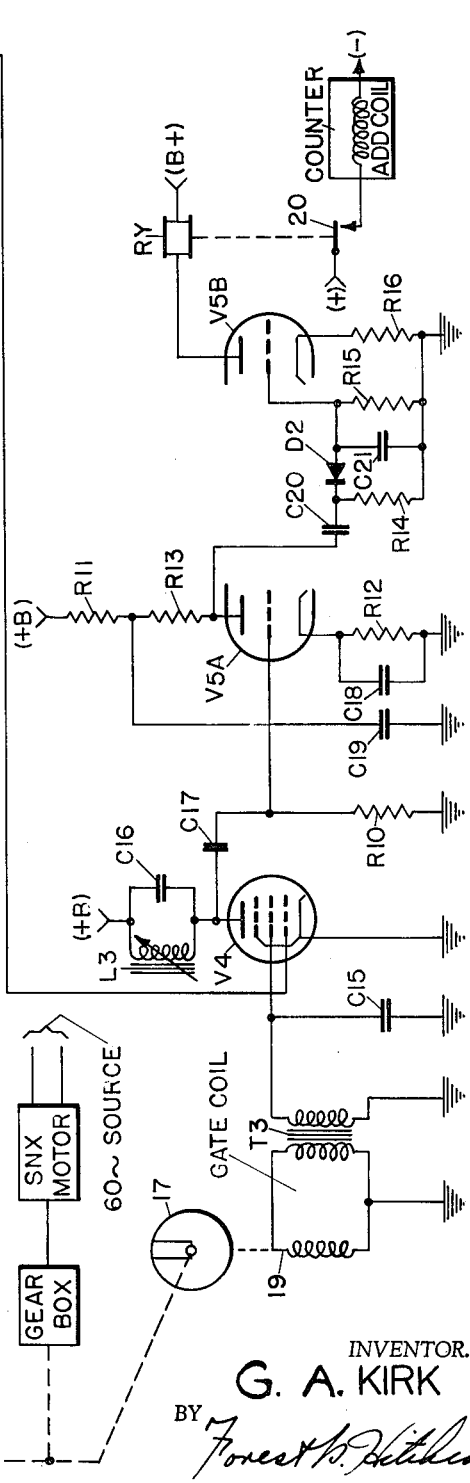
FIG. 4
INVENTOR.
G. A. KIRK
BY Forest W. Hitchcock
HIS ATTORNEY April 26, 1966

G. A. KIRK 3,248,691

OBJECT DETECTION SYSTEM

Original Filed April 2, 1962

INVENTOR.
G. A. KIRK
BY
Forest N. Hitchcock
HIS ATTORNEY

United States Patent Office 3,248,691
Patented Apr. 26, 1966

3,248,691
OBJECT DETECTION SYSTEM
George A. Kirk, Ridgewood, N.J., assignor to General Signal Corporation, a corporation of New York
Continuation of abandoned application Ser. No. 184,281, Apr. 2, 1962. This application Dec. 11, 1963, Ser. No. 331,084
8 Claims. (Cl. 340—38)

This invention relates to a system for reliably detecting objects moving over a fixed path and more specifically relates to an ultrasonic detection system wherein highly stable timing and gating circuits are established in accordance with the line frequency of the power supply.

This is a continuation of my prior copending application Ser. No. 184,281, filed April 2, 1962, which has been abandoned in favor of this application.

Detection systems of the type disclosed herein are particularly adaptable to the exercise of electronic controls which function in accordance with the movement of vehicles over a detection zone established by the projection of discrete pulses of energy onto a fixed reflecting surface. Such systems have particular utility in the control of vehicles moving over a public highway or in the routing of vehicles entering and leaving ramp type garages.

Generally, such systems employ some form of electronic means to generate discrete pulses of electromagnetic energy which may be converted into other energy forms, such as sonic energy, by means of a transducer. Timing means are provided which control the pulse repetition rate of the aforementioned electronic pulse generator. The cyclic period of the timing means is selected as a function of the transit time required by a discrete energy pulse to strike the fixed reflecting surface and be reflected back to a receiving means. A variety of gating circuit configurations have been previously proposed to exercise a desired control by rendering the receiving means responsive to energy pulses reflected from the fixed reflecting surface or from a vehicle passing over the detection zone established by the discrete energy pulses projected onto the fixed reflecting surface.

The effectiveness and reliability of such previously disclosed detection systems is to a large measure determined by the stability of the timing and gating circuits employed in the system. Heretofore, the timing and gating circuits utilized have been established by precision components such as resistor-capacitor combinations. As such components are highly sensitive to external and internal temperature and atmospheric changes there is a tendency for the timing and gating pulses to drift and unreliable detection results as these components must establish precise timing and gating periods. Other factors affecting the design of such circuits are the relative complexity of the resulting circuit configurations and the high cost of the components involved.

Broadly disclosed, the present invention contemplates a transducer positioned over the highway for directing the generated pulses downwardly so that, with no vehicle present, the pulses will be reflected from the surface of the highway to a receiver. Assuming a vehicle in the detection zone, the generated pulses will be reflected from the top of the vehicle present in the detection zone. The receiving means must therefore be gated to distinguish between the two different kinds of received reflection pulses and it does so on the basis of the delay in time of their reception with respect to the original transmitted pulses.

Two forms of the present invention are disclosed herein. In the first form of the invention, the transmitted pulses are propagated in accordance with the frequency of a constant speed device, such as a synchronous motor. The speed of this type motor is essentially constant and is dependent upon the line frequency. Affixed to the armature shaft of the motor are two pole pieces, a predetermined number of degrees out of phase. The first pole piece develops a pulse in an adjacent field coil which is utilized to actuate the transmitter once during each period of rotation of the pole piece. Depending upon the height of the transducer with respect to the pavement, any desired repetition rate may be established by providing suitable gearing between the motor shaft and the first pole piece.

Receiver gating is accomplished in accordance with the period of rotation of the second pole piece affixed to the motor shaft. A receiver gating pulse is generated in a second field coil due to the magnetic interaction of the moving pole piece and the stationary gating coil. The desired time differential between the transmitter timing and receiving gating pulses is established by affixing the second pole piece to the motor shaft a predetermined number of degrees out of phase with the first pole piece.

Therefore, it can be seen that for a given distance from transducer to the highway pavement, successive discrete energy pulses may be propagated by the transmission means with a period in accordance with the angular velocity of the first pole piece and the receiving means may be made responsive to the pulse reflected from the top of a vehicle in the detection zone in accordance with the out of phase condition of the second pole piece relative to the first pole piece. The duration of the discrete energy pulses is a function of the width of the face of the first pole piece, and the duration of the receiver gating pulse is similarly a function of the width of the face of the second pole piece. The system therefore is completely adjustable once the transducer height above the pavement is known. The pole pieces are serrated to prevent a decaying signal voltage from developing in the pick up coils. This signal is rectified and filtered in order to present a flat topped signal for the gating circuit.

The inventive concept presupposes a second method of establishing the propagation time of the transmitter and the time at which the receiver will be responsive to the sonic pulses reflected from vehicles moving over the detection zone of the highway pavement. In the second method, a switching tube is employed to establish variable timing and gating circuits in accordance with the transducer height above the pavement. As all timing and gating pulses established by either method are controlled by the line frequency, the possibility of drift in the establishment of the propagation time or the gating time is reduced to a minimum as the frequency of the input power is not affected by changes in external or internal atmospheric and temperature conditions. Since this arrangement alleviates the necessity for relatively complex electronic circuits and precision components, a reliable detection system is developed which is low in cost and relatively simple from a design view point.

It is thus an object of this invention to provide a system for the detection of objects which is relatively inexpensive to manufacture yet is highly reliable in its operation.

It is another object of this invention to provide a system for the detection of objects wherein the timing and gating circuits are established in accordance with the line frequency of the power supplied.

It is another object of this invention to provide an ultrasonic detection system of the type described which utilizes a single transducer for both transmitting and receiving purposes.

It is further an object of this invention to provide a detection system of the type described wherein the receiver is made responsive only to propagated discrete energy pulses which are reflected from an object passing over a detection zone location in a fixed reflecting surface.

It is a further object of this invention to provide an ultrasonic object detection system of the type described employing a single transducer wherein the receiving means although directly coupled to the transmitting means is responsive only to energy pulses reflected from an object passing over a detection zone location in a fixed reflecting surface.

Other objects, purposes, and characteristic features of this invention will be obvious from the accompanying drawings and in part pointed out as the description of the invention progresses.

In describing this invention in detail reference will be made to the accompanying drawings which show various views of the present invention and in which different parts are referred to by distinctive reference characters and like parts by like reference characters, and in which:

FIG. 1 illustrates one means for positioning the apparatus of one embodiment of the present invention;

FIG. 3 is a block diagram illustrating the circuit organization of said first form of the object detection system of the present invention;

FIG. 4 is a schematic diagram of said first form of this embodiment of the present invention.

For the purpose of simplifying the illustrations and facilitating the explanation thereof, various parts and circuits constituting this embodiment of the present invention have been shown diagrammatically, and certain conventional illustrations have been employed. The drawings have been made more for the purposes of facilitating the disclosure of the present invention as to its principle and mode of operation rather than for the purpose of illustrating the specific construction and arrangement of parts that will be employed in practice. Thus the circuits are shown schematically and symbols are used to indicate connections to the terminals of batteries or other sources of electric current.

FIG. 1 illustrates one suitable mast arm type installation showing a unitary transmitting and receiving transducer 10 mounted substantially parallel to the pavement. The remainder of the equipment is located in a suitable equipment case 11 mounted on the mast 12. The transceiver consists of a transmitter, receiver and power supply which may be mounted on a single chassis.

Figure 2:
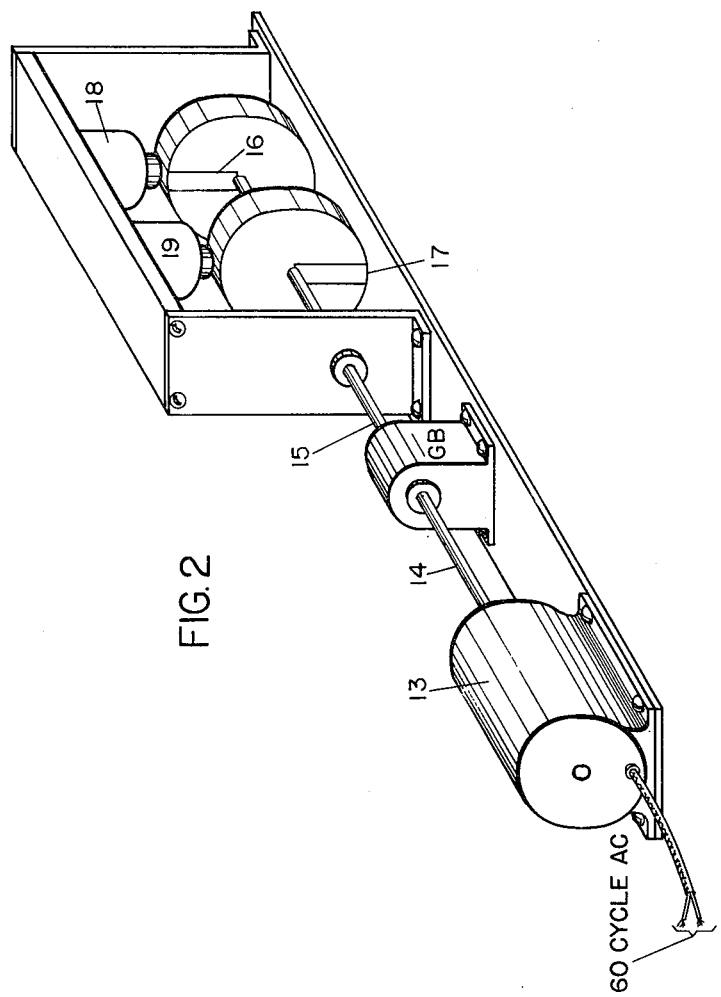
FIG. 2 is a detailed view of a first form of means for establishing the timing and gating pulses of the object detection system of the present invention.

FIG. 2 is a detailed view of the first form of the apparatus used to produce the timing pulses necessary to establish the repetition rate of the transmitter and for generating the gating pulses for rendering the receiver responsive only to discrete pulses of sonic energy reflected from a vehicle passing through the detection zone.

*Embodiments of FIGS. 2, 3 and 4*

In this first form of the present invention, a constant speed device, such as synchronous motor 13, is employed to rotate a shaft 14 at a predetermined frequency of rotation. A second shaft 15 is driven by the motor shaft 14 through a suitable gear ratio system as indicated by the gear box GB. Affixed to the shaft 15, as by means of two rotatably mounted nonmagnetic plastic drums, are two pole pieces 16 and 17 which are mounted to rotate with the shaft 15. The pole piece 16 is shown as being 180° out of phase with the pole piece 17.

Two inert coils 18 and 19 are mounted adjacent the pole pieces 16 and 17. The magnetic interaction between the pole piece 16 and the coil 18, caused by rotation of the pole piece 16 by the coil 18 is utilized to develop a timing pulse which is applied to the transmitter to cause said transmitter to propagate a discrete sonic energy pulse in a manner to be hereinafter described. In the same manner, the magnetic interaction of the pole piece 17 and the coil 19 caused by rotation of the pole piece 17 by by the coil 19 is used to generate a gating pulse which renders the receiving means of the detection system responsive to received energy throughout a time period encompassing the expected time of reception of reflection pulses from an object in the detection zone.

Any desired time differential may be established between the timing pulse and the gating pulse by proper selection of the phase relationship between the pole pieces 16 and 17 in accordance with their respective positions on the shaft 15. For example, assuming the synchronous motor B rotates at a frequency of eighteen hundred r.p.m. and the gear box GB establishes a 2:1 ratio between the motor shaft 14 and the drive shaft 15, then the pole pieces should be rotated past their respective field coils at a frequency of nine hundred r.p.m. or fifteen c.p.s. Therefore, the repetition rate of the sonic energy pulses propagated by the transmitter will be fifteen c.p.s. and one pulse of sonic energy will be propagated by the transmitter in accordance with the period of rotation of the pole piece 16 or once every 66 milliseconds. If, in order to avoid detailed calculations, we assume the speed of sound to be one thousand feet per second in the operational environment of the detection equipment, then in order to insure sufficient round trip transit time for the generated sonic pulse, it would be necessary to mount the transducer no more than thirty-three feet above the fixed reflecting surface. That is to say, that in view of th assumptions made, and presuming a period of 66 milliseconds for the pole piece 16, a generated pulse would have time to travel thirty-three feet from the transducer to the pavement and be reflected back to the transducer before the next timing pulse is generated by the interaction of pole piece 16 and the transmit coil 18.

With the pole piece 17 mounted 180° out of phase from the pole piece 16, it would generate a gating pulse which would make the receiver responsive to the transmitted pluse thirty-three milliseconds after the transmitted pulse has been propagated. Therefore, if a vehicle is passing through the detection zone and the transmitted pulse is reflected from the top of the vehicle, a shorter round trip transit time than 66 milliseconds would result depending on the height of the transducer above the pavement and the height of the passing vehicles. In this manner, by selectively placing the pole piece 16 and 17 on the drive shaft with respect to each other, the receiver may be made nonresponsive to energy pulses reflected from a fixed reflecting surface any desired distance from the transducer and made responsive only to the shorter distance from the transducer and made responsive only to the shorter transit time pulses reflected from an object in the detection zone. As previously mentioned, variable gating pulse widths may be established by altering the width of the pole face of the magnet, and it will be recognized from the foregoing description that the width of the gating pulse establishes the duration of the interval through which the receiver is responsive to reflection pulses.

FIG. 3 is a block diagram illustrating broadly the transmitter and receiver of the object detection system. The transmitter comprises a trigger tube and an oscillator for generating an electrical pulse comprising a series of oscillations at a predetermined frequency generally in the region of from 17 kilocycles to 20 kilocycles per second. Each such electrical pulse is converted to a corresponding pulse of super sonic energy by means of a suitable electro-acoustic transducer 10.

Although the preferred form of the discrete energy pulses utilized with the object detection system of the present invention are preferably ultrasonic in nature, it is to be understood that the underlying inventive concept disclosed herein presupposes the employment of other forms of energy pulses or sonic pulses in the audible range.

As previously discussed, the timing pulse for establishing the repetition rate of the transmitter is developed by the magnetic interaction of the rotating pole piece 16 and the transmit coil 18. This pulse passes through an impedance matching transformer T1 to the grid of a suitable trigger tube such as the thyratron V1. Oscillations by the oscillator including tube V2 are triggered by the firing of the thyratron V1 in response to the input pulses. When the thyratron is non-conducting, the oscillator V2 is rendered inoperative.

The transmitted pulse is reflected from a fixed reflecting surface or from an object in the detection zone and picked up by transducer 10. The reflected pulse is fed to the receiver by means of a suitable matching transformer (not shown). Due to the coupling between the receiver, a portion of the energy of each transmitted pulse is fed directly into the receiver. The directly transmitted pulse fed into the receiver is discriminated against because its excessively high amplitude as compared with a reflected pulse blocks the tuned amplifier V3. The grid circuit arrangement of this tube is such that it quickly restores itself to its normal quiescent condition and is ready to respond to the relatively highly attenuated pavement or vehicle reflected pulse. Typical values for the amplitude of the vehicle or pavement echo would be on the order of a millivolt or less and therefore grid blocking of the tuned amplifier V3 does not occur.

At a time after a pulse is initially transmitted, predetermined in accordance with the relative positions of the pole pieces 16 and 17 on the drive shaft 15, a gate pulse developed in the gate coil 19 by the pole piece 17 is impressed across the transformer T3 and renders the receiver responsive for a time equal to the gate pulse width by causing the tuned amplifier V4 to become operative as an amplifier. A suitable time differential between the timing and the gating pulses will be selected in accordance with the distance between the transducer and the tops of the vehicles to be detected, and the pole pieces are positioned on the shaft accordingly.

The object detection system of the present invention exercises a suitable control, such as operation of a counter, by feeding the amplified gated pulses reflected from a vehicle to an output circuit composed of a twin triode stage V5. Section A of V5 operates as an amplification stage. Section B of the tube V5 is normally conducting, keeping relay RY energized when the tube is in its normally quiescent operating condition, i.e. with no amplified vehicle reflected pulse periodically present on the plate of section A of the twin triode V5. When the amplified gated pulse is fed to the grid of section A of the tube V5, the output of this portion of the twin triode tube is coupled to the grid of section B in such manner as to develop an increased negative bias on the grid of the latter section of the tube, causing a reduction in current in the plate circuit of the section B, deenergizing the relay, and closing a back contact which actuates the add coil of a counter to provide a vehicle count.

More specifically, referring to FIG. 4, as hereinbefore explained, the input timing pulse is developed at a suitable level, typically two volts peak-to-peak, due to the interaction of the magnetic material of the pole piece 16 and the transmit coil 18. This pulse passes through impedance matching transformer T1 and is fed to the grid of the thyratron V1 through the capacitor C1. A typical value for the amplitude of this pulse would be on the order of approximately ten volts peak to peak. The capacitor C1 also functions as a blocking means for the —4 volts bias on the grid of the thyratron V1. This bias may be established by any of the usual biasing methods, such as a selenium bridge inserted in the filament winding of the power supply transformer. With the grid made sufficiently positive for ionization to occur, the thyratron will be operated as a gas diode. The plate acts as a dummy electrode, and consequently a large current-limiting resistor R1 is necessarily connected in the grid circuit.

The cathode of the output Colpitts oscillator V2 is connected in series with the anode of the thyratron V1. Thus, when the thyratron conducts, a positive voltage equal to the internal arc drop of the thyratron is applied to the cathode of the oscillator V2. With the grid of the oscillator at ground potential, a fixed bias is applied, causing the oscillator V2 to generate a transmitter burst in response to the conduction of the thyratron. When the thyratron is non-conducting the cathode return of the oscillator V2 is open-circuited and oscillations stop. A visual record of the operation of the oscillator is provided by the C7, R4 and lamp PL circuit arrangement.

Screen and plate operating voltages are supplied by means of R3 and D.C. blocking capacitor C8. Sself-biasing of the grid is accomplished by the resistor R2 and capacitor C22.

Energy is fed back from the plate circuit of the oscillator V2 to the grid circuit by means of the tank circuit comprising inductor L1 and capaictors C3 and C4. The oscillator frequency is varied by means of the tunable inductor L1. The output burst of the oscillator V2 is coupled to the transducer 10 by means of the impedance matching transformer T2. The secondary of the transformer L4 and the capacitor C9 comprise a series filter resonant at the operating frequency of the oscillator V2. The purpose of this filter is to eliminate the 15 cycle repetition rate transducer clicks which would be audible.

A portion of the transmitted pulse is unavoidably fed to the receiver by means of the primary of T2. This transmitted burst appears on the grid of the first tuned amplifier V3 through the capacitor C10 and the resistor R5. The grid limiting resistor R5 limits the grid current during the high positive swing of the directly coupled transmitter pulse. Due to the grid rectification action of the diode D1, capacitor C10 charges quickly in the negative direction and blocks the tube. The cut-off time is determined by capacitor C10 and resistor R6. Tube V3 recovers quickly and is then ready to receive a pulse reflected either from the pavement or from a vehicle present in the detection zone.

The amplitude of the reflected pulse is extremely small as compared to the directly coupled transmitter pulses, and no grid blocking occurs. Values for resistors R5 and R6 are selected so that less than 10 percent of the reflected pulse is attenuated. The tube V3 is tuned to the transmitter frequency by means of the tank circuit L2 and C11. Tuning is accomplished by means of the tunable slug 12. The output signal from the tuned amplifier V3 is capacitively coupled to the grid of the tuned amplifier and gating tube V4 by means of the capacitor C14 and resistor R9.

Plate and screen operating voltages for the tube V3 are provided respectively through resistors R7 and R8. The usual screen bypass capacitor having a low reactance at the signal frequency is shown at C13. The plate supply bypass capacitor is shown at C12.

The V4 stage is a standard amplifier tuned to the transmitter frequency in accordance with tunable slug L3 of tank circuit L3 and C16 with the exception that the screen grid is maintained at ground potential and, consequently, under normal conditions, no amplification will occur. At a time after the transmitter pulse, determined by the relative position of pole piece 17 with respect to the pole piece 16, a gating pulse developed by the magnetic interaction of the rotating pole piece 17 and the gate coil 19 is impressed on the screen grid of the tuned amplifier, causing it to amplify during this period. If at this time a pulse, reflected from a vehicle back to the unitary transducer 10, appears on the control grid of the tube V4, it will be amplified and fed to the grid of section A of the relay control tube V5 by means of the capacitor C17 and resistor R10. Grid biasing for this stage is established by means of the usual cathode resistor R12/capacitor C18 combination. The plate voltage is supplied through resistors R11 and R13. Capacitor C19 is the supply voltage signal bypass to ground.

The amplified vehicle reflected signal appearing at the output of section A, of the tube V5 is coupled to section B of the tube by means of capacitor C20 and resistor R14. This signal will be rectified by the action of the diode D2, causing a negative bias to be developed on the grid of section B of tube V5. The negative bias causes a reduction in the current in the plate circuit of section B of V5, causing relay RY to become deenergized.

The deenergization of the relay RY closes its back contact 20, causing the energization of the add coil of the counter. When section B of the tube V5 is restored to its normal conducting condition by the termination of the negative pulse on the grid, the relay RY will again become energized, opening its back contact 20 and causing one unit to be added to the display means of the counter in response to the passage of the vehicle from the detection zone. The time constant of the capacitor C21 and the resistor R15 is such that relay chatter is prevented at the repetition rate of the detection system. Grid biasing is established in accordance with cathode resister R16.

Figure 5:
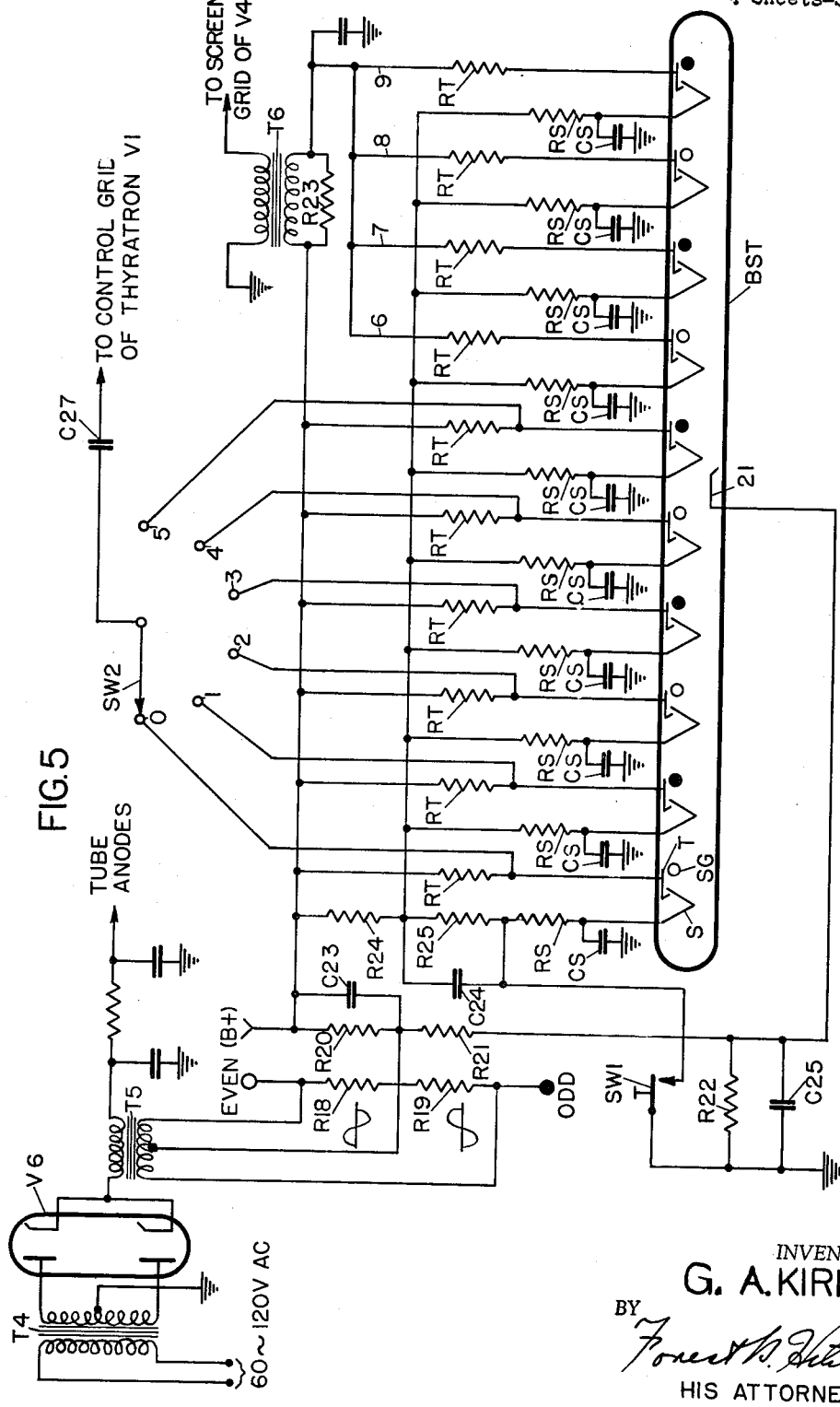
FIG. 5 is a schematic diagram of a second form of means for establishing the timing and gating circuits of the present embodiment of this invention.

*Embodiment of FIG. 5*

In the second form of the invention, a beam switching tube BST is used to develop the timing and the gating pulses necessary for operation of the detection system. One suitable beam switching tube is commonly called the "Beam–X" and is manufactured by the Burroughs Corporation of Plainfield, New Jersey.

Referring to FIG. 5, it can be seen that this beam switching tube BST comprises a high vacuum tube which has a centrally located cathode 21 surrounded by a series of 10 identical arrays. Each array is composed of a target plate T, a high impedance grid SG and a beam-forming and locking spade S. The electron beam which is developed in the tube is directed by means of internal permanent magnets, the magnetic field of which operate in conjunction with the applied electric field to comprise the "crossed" fields necessary for tube operation.

Normally, the electron beam is formed between the central cathode 21 and one of the arrays. Moreover, as all of the arrays are identical, the description of one pertains to all. With reference to the "0" array, the greatest portion of the beam current flows to the respective target plate T where it provides a useful "pentode-like" substantially constant current output. The associated spade S draws sufficient beam current to maintain it slightly below the cathode potential and thus locks the beam on a particular target. The beam may be made to advance from array to array with the direction of the advance being determined by the polarity of the magnetic field and the rate determined by the tube characteristic and the loading capacitances present in the circuit.

The beam forming position is usually referred to as the "on" position. The adjacent array to which the beam is normally advanced is called the "lead" array. The beam is switched from the "on" array to the "lead" array by applying a large negative pulse to the "on" switching grid. This pulse frees the "on" target of the electron beam and allows the magnetic field to rotate the beam. The beam then impinges on the highly positive "lead" spade, which conducts and rapidly falls to approximately cathode potential, thus forming and locking the beam on the next target. This target now becomes the "on" target.

In order to reset the electron beam to the "0" target plate, a large negative pulse is supplied to all spades simultaneously. This extinguishes the electron beam. The beam is formed at the "0" array by applying a larger negative pulse on the "0" spade than that applied to the other spades. The beam then forms and locks on the "0" target plate.

The switching grids are connected in two "odd" and two "even" groups of five each. Therefore, with the type of input feed shown across R18 and R19, one even and one odd grid are driven negatively during each input cycle in accordance with the input wave forms shown. The primary of the transformer T5 is inserted in series with the cathode lead of the full wave rectifier used with the power supply. The center tap of the secondary is used as the grid return. Grid bias is developed in accordance with the voltage divider formed by R20 and R21.

Under these circumstances, if we assume a line frequency of 60 cycles per second, the full-wave rectifier V6 causes the voltage waveform at the primary of T5 to have a frequency of 120 cycles per second. Due to the center-tapped secondary type input utilized, beam switching occurs at a rate of 240 cycles per second. As the tube contains 10 target anodes and the beam switches sequentially for each negative pulse applied to a given switching grid, the beam is rotated over one cycle of tube operation 24 times per second or approximately every 41 milliseconds. Consequently, the beam is fixed at each target anode for approximately 4.1 milliseconds.

The circuit configuration of this second form of the object detection system of the present invention uses the selector switch SW2 to provide a variety of time differentials between the timing and gating pulses. For example, with the switch SW2 as shown in position 0, a timing pulse is provided to overcome the hold-off bias of the thyratron V1 through differentiating capacitor C27. Approximately 24.6 milliseconds later a gate pulse of 16.4 milliseconds duration will be applied to the screen grid of V4 by means of the transformer T6. This occurs due to the fact that the target anodes of the arrays 6 through 9 inclusive are connected to a common buss through the primary winding of the transformer T6.

If the selector switch SW2 is indexed to position 1, a gate pulse will be impressed on the primary of the transformer T6 20.5 milliseconds after the timing pulse causes the thyratron V1 to conduct. In a similar manner, the switch SW2 may be indexed to position 5 whereupon the gate pulse would occur 4.1 milliseconds after the start pulse. In this manner, the time between start and gate pulses may be varied precisely in 4.1 millisecond increments in order to differentiate between pavement reflected pulses and object reflected pulses for a given transducer height above the pavement.

Target potential is established by connecting the individual target anodes to a common B+ buss through their respective target resistors R$t$. Spade operating potentials are similarly made available through a common B+ supply buss connected to the common target anode buss by means of resistor R24 and respective spade resistors RS. The cathode 21 of the beam switching tube BST is connected to ground through the capacitor C25 and resistor R22 combination.

The tube BST is reset to the "0" position by means of the switch SW1. Since the ratio of resistance values Rs/R25 is rather large, the charge on the capacitor C24 is negligible if the beam is at the "0" position, and the charge is zero if the beam is in any other position. When the switch SW1 is closed, the potential at the junction of Rs and R25 and the spade buss potential drop to zero. This "clears" the tube. Immediately after the switch is closed, the capacitor C24 charged through R25. When the switch SW1 is opened, the spade buss tends to assume its normal operating potential. However, due to the charge on capacitor C24, the "0" spade is held negative with respect to the spade buss voltage immediately after the opening of the switch SW1 and the beam will form at this low potential spade. For a more detailed analysis of the "Beam-X" switching tube BSY, reference may be made to Brochure BX535 published by the Burroughs Corporation of Plainfield, New Jersey.

Having described two forms of the object detection system of the present invention, it is to be understood that various adaptations, alterations and modifications may be applied to the specific forms disclosed in accordance with the requirements of practice. For example, a variety of beam switching or ring counter tubes are commerically available which may be substituted for the "Beam-X" switching tube and other methods of mounting the transmit and gating pole pieces may be applied to the specific forms shown in accordance with the requirements of practice and still be within the spirit or scope of the present invention.

What is claimed is:

1. In a system for detecting objects passing through a detection zone defined by a beam of discrete energy pulses comprising, transmitting means for directing said beam toward a fixed reflecting surface more distant than said vehicles and upon which said pulses impinge only when no vehicle is in said zone, normally inoperative receiving means, and gating means for controlling said receiving means to become operative only throughout the expected range of reception times of reflection pulses from said vehicles but not throughout the expected range of reception times of reflection pulse from said more distant reflecting surface, said gating means including:
 (a) a synchronously rotating element,
 (b) a permanent magnet carried by said rotating element,
 (c) an inductor,
 (d) said rotating element rotating said magnet throughout a magnetic coupling relationship with said inductor during a predetermined portion of the rotary motion of said element to thereby generate a gating voltage,
 (e) means for applying said gating voltage to said receiving means to render said receiving means operative, means responsive to the passage of said rotating element through a different predetermined rotational position to control said transmitting means to generate one of said pulses, and means responsive to the output of said receiving means for indicating the presence of a vehicle in said detection zone.

2. The system of claim 1 wherein said responsive means includes a second magnet carried by said rotating element and also includes a second inductor passing through an inductive coupling relationship with said second magnet and having a voltage induced therein by said second magnet as said element passes through said different predetermined rotational position, said last-named voltage controlling said transmitting means to generate an energy pulse.

3. The system of claim 2 which further includes means for adjusting the difference in angular positions of said element wherein respectively said second inductor and second magnet are in said magnetic coupling relationship and wherein said first magnet and first inductor are in said predetermined coupling relationship.

4. In a system for detecting vehicles passing through a detection zone comprising: transmitting means for intermittently transmitting discrete energy pulses toward a fixed reflecting surface more distant than said vehicle and upon which said pulses impinge only when no vehicle is in said zone, normally inoperative receiving means receiving a reflection pulse from any vehicle in said detection zone for each transmitted pulse during a first predetermined interval occurring after the time of pulse transmission but instead receiving a reflection pulse throughout a later predetermined interval when no vehicle is in said detection zone and reflections are instead received from said fixed reflecting surface, a synchronously rotating element, first means operatively coupled to said element for controlling said transmitting means to generate a pulse in response to rotation of said element through a first predetermined angular position, permanent magnet means carried by said rotating element, stationary inductor means having a gating voltage induced therein by said magnet as said rotating element passes through a second range of angular positions throughout one of said predetermined intervals but not the other, means for controlling said receiving means to be responsive to received reflection pulses throughout the duration of said gating voltage, and vehicle registering means controlled by the output of said receiving means for registering the presence of a vehicle.

5. The system of claim 4 which further includes means for adjusting the angular difference between said first angular position and said second range of angular positions of said rotating element.

6. In a system for detecting vehicles passing through a detection zone comprising: transmitting means for intermittently transmitting discrete energy pulses toward a fixed reflecting surface more distant than said vehicle and upon which said pulses impinge only when no vehicle is in said zone, normally inoperative receiving means, said receiving means receiving a reflection pulse from any vehicle in said detection zone for each transmitted pulse during a first predetermined interval occurring after the time of pulse transmission but instead receiving a reflection pulse throughout a later predetermined interval when no vehicle is in said detection zone and reflections are instead received from said fixed reflecting surface, an energy source having a predetermined frequency, a beam switching tube having a central cathode surrounded by a plurality of arrays each of which includes a target plate, a grid, and beam-forming elements, circuit means connected to said energy source for applying switching pulses at a predetermined rate to said grids of said beam switching tube for causing the beam to transfer successively from one target plate to the next at said predetermined rate, said transmitting means being operatively coupled to a first selected one of said target plates for generating one of said energy pulses each time said beam is on said selected target plate, and gating means connected to at least one other target plate selected relative to said one target plate such that said beam will be on said other target plate throughout one of said predetermined intervals but not the other, said gating means controlling said receiving means to be responsive to reflection pulses only when said beam is on said other target plate, and means controlled by the output of said receiving means for registering the presence of a vehicle.

7. The system of claim 6 wherein said gating means is operatively connected to a preselected plurality of successive target plates each having said beam thereon during a different successive portion of said predetermined interval.

8. The system of claim 7 wherein switching means permits said transmitting means to be operatively coupled to selected different target plates to thereby permit a variation in the time interval between the transmission of each energy pulse and the beginning of said predetermined interval.

No references cited.

NEIL C. READ, *Primary Examiner.*

T. B. HABECKER, *Examiner.*